United States Patent [19]
Leonard

[11] 3,884,115

[45] May 20, 1975

[54] INTERVAL TEACHING AID

[76] Inventor: Verna M. Leonard, 8701 Highway 41, Fresno, Calif.

[22] Filed: July 24, 1974

[21] Appl. No.: 491,518

[52] U.S. Cl................................. 84/471; 84/474
[51] Int. Cl........................................... G09b 15/02
[58] Field of Search............................ 84/470–474, 84/477 R

[56] References Cited
UNITED STATES PATENTS

| | | | |
|---|---|---|---|
| 3,592,099 | 7/1971 | Gibby | 84/471 X |
| 3,700,785 | 10/1972 | Leonard | 84/470 |
| 3,728,931 | 4/1973 | Leonard | 84/471 |

Primary Examiner—Stephen J. Tomsky
Assistant Examiner—John F. Gonzales
Attorney, Agent, or Firm—Ralph S. Branscomb

[57] ABSTRACT

The invention is designed to teach a music student the relationship between the various combinations of intervals used in music to the musical scale, with emphasis on the repetitive, cyclic nature of the scale structure. Rotatable discs having peripheral arrays of the scale tones in the chromatic and whole step scales are positioned on a planar base above a plurality of selectively exposable strips, each of the strips having a plurality of spaces for the inscription of scale tones and an identification of the interval scheme to be used to correctly fill in the blanks.

4 Claims, 2 Drawing Figures

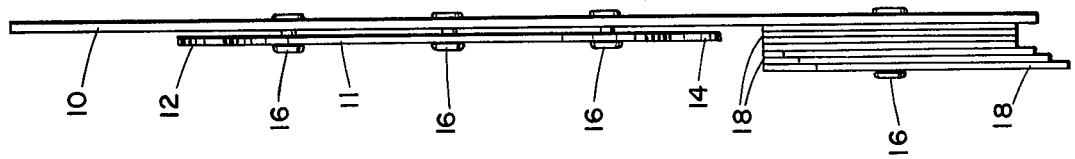
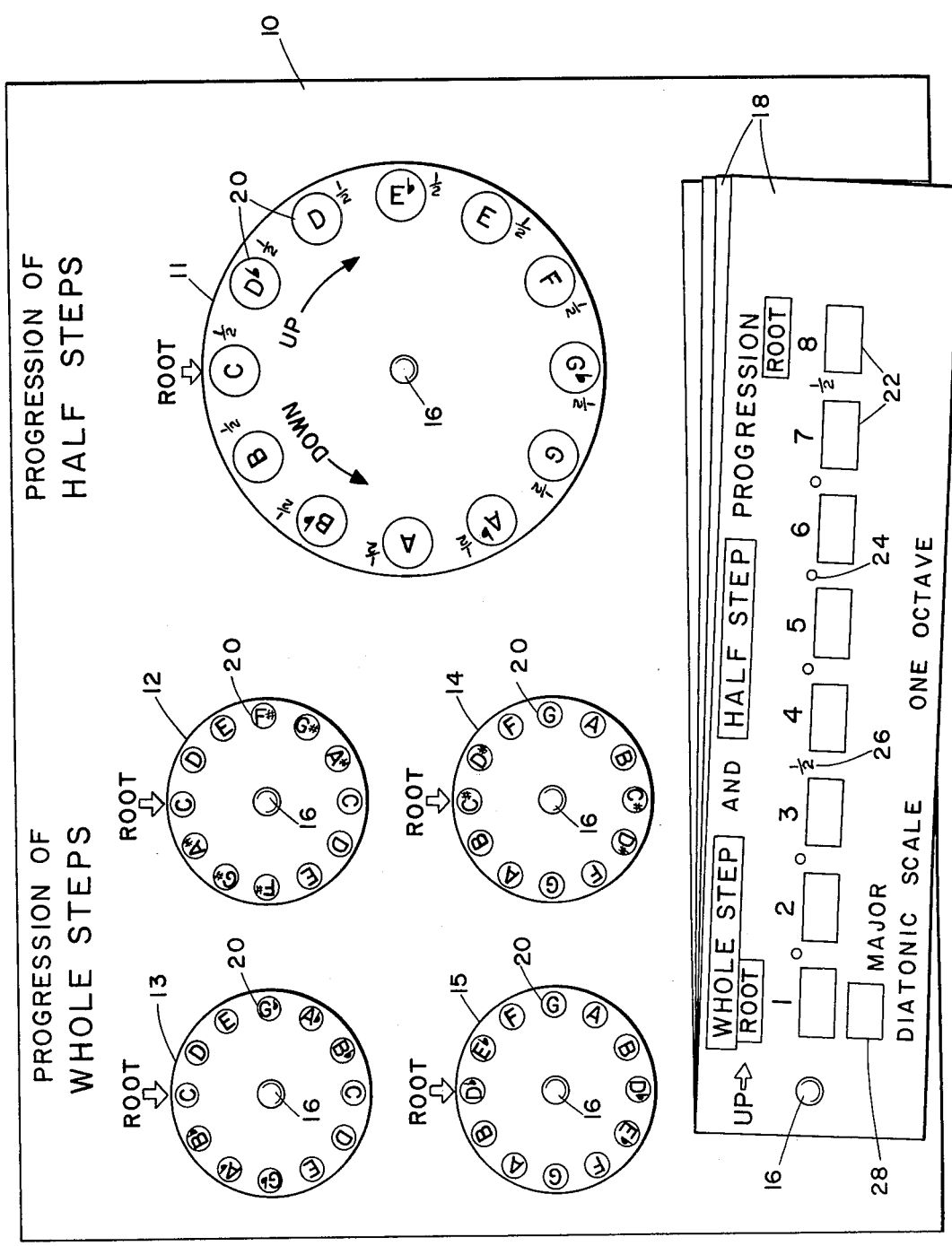

3,884,115

INTERVAL TEACHING AID

BACKGROUND OF THE INVENTION

Beginning music students are exposed to a variety of intervals between notes and combinations of these intervals, for example, the whole and half step intervals to begin with, the diatonic scale, primary chord intervals, and others. A piecemeal approach to these various intervals is generally used, making it difficult for the student to visualize the relationship of each interval combination to the overall music scale structure.

SUMMARY OF THE INVENTION

The present invention presents the student with a visual display of cyclically arranged whole and half step progressions, which are the rudiments of the occidental scale structure. A series of panels are also provided, each individual panel representing a particular interval structure which is identified on the panel, and a plurality of blank squares numerically identical to the number of scale tones in the named interval.

By referring to the whole step and half step progressions, the student is able to correctly fill in the blanks with scale tone names and in so doing familiarize himself with the structure of the interval in question and its construction from the whole step - half step progressions.

BRIEF DESCRIPTION OF THE DRAWINGS

FIG. 1 is a front elevation view of the invention; and

FIG. 2 is a side elevation looking from the right side of the invention in FIG. 1.

DETAILED DESCRIPTION OF THE PREFERRED EMBODIMENT

The invention is physically very simple, comprising a planar base 10, discs or dials 11, 12, 13, 14, and 15 centrally pivoted to the base with rivets 16 or otherwise, and a plurality of selectively exposable panels 18 likewise pivoted at 16. Everything but the rivets can be made of paper. Each of the discs has a peripheral array of scale tone names 20, the particular selection depending on the disc.

The first disc II displays consecutively all twelve notes in the chromatic scale, which includes every note in the music systems, beginning at C and covering an entire octave and ending with B. The accidentals in the progression are all indicated as flats, it being noted that they could be represented as the lower notes sharped, or a second dial could be added indicating the sharps.

The remaining dials are similar but display progressions of whole steps rather than half steps spanning two octaves so that the dials will have a uniform appearance. Since only half the notes occur in a particular whole step progression, two scales, 12 and 14, are provided so that all the notes are represented, and each of these has a musical duplicate, 13 and 15 respectively, which indicate the accidentals as flats rather than as sharps.

Each of the panels 18 is provided with a series of writing spaces 22 and is identified as to the scale or interval structure to be reproduced in the spaces. The exposed panel in the drawings is provided for the major diatonic scale and the sizes of the steps between the notes is indicated by the circles 24, indicating whole steps, and the fractions 26, indicating half steps. An additional blank 28 may be provided for the student to inscribe the key signature in which the scale he will write falls.

The notation "ROOT" and the arrow on the base above each disc of course remains stationary and is useful in indicating the beginning position, or root, of the diatonic scale or chord displayed on the particular panel. For example, when using the panel exposed in FIG. 1, the user would write C in blank 28 and the first of the blanks 22. D is one full step from C, which can be determined from the disc II, and is written in the second of the squares 22. Half step intervals can similarly be determined from the appropriate one of the remaining dials.

The remaining panels 18 which are not shown in full may represent any other interval or sequence of notes, for example, a diatonic fifth interval, a major third, or a complete major primary chord, although the emphasis will normally be on the diatonic scales due to their fundamental role in music. After completing a complete set of the panels the student will have a firm grasp of the relationship between musical scale progressions and intervals.

I claim:

1. A muscial teaching aid comprising:
   a. a substantially rigid planar base;
   b. a first disc rotationally mounted at the center thereof to said base and having on the side thereof remote from the base an angularly spaced peripheral array of indicia indicating in order the scale tone names of the notes of one octave of the chromatic musical scale;
   c. a second disc rotationally mounted at the center thereof to said base and having on the side thereof remote from the base an angularly spaced peripheral array of indicia indicating in order the scale tone names of notes of a progression of whole step intervals.
   d. a plurality of selectively exposable panels mounted on said base, each of said panels having thereon ordered spaces for the inscription of scale tone names and indicia indicating the structure of the scale tones to be named in the spaces.

2. Structure according to claim 1 wherein the progression on said second disc is a two octave progression and includes the particular scale tone C and indicates all accidentals as sharps, and including a third disc identical to the second disc except all accidentals are indicated thereon as flats.

3. Structure according to claim 2 and including a fourth and fifth dial, each being rotationally mounted at the center thereof to said base and having on the side thereof remote from the base an angularly spaced peripheral array of indicia indicating in order the scale tone names of a two-octave progression of whole step intervals including the particular scale tone F, the accidentals of the progression on the fourth dial being indicated as sharps and the accidentals of the fifth dial being indicated as flats.

4. Structure according to claim 3 wherein said second, third, fourth and fifth discs relating to whole step intervals are of identical diametric dimension and are arranged with their centers as the four corners of a geometric square on the upper left portion of said base, said first disc is on the order of twice the diameter of the other discs and is centered on the upper left portion of said base, and said selectively exposable panels are collectively pivoted at the ends thereof to the lower portion of said base.

\* \* \* \* \*